United States Patent

[11] 3,528,352

| | | |
|---|---|---|
| [72] | Inventor | Yoshizo Ikegami<br>Hyogo, Japan |
| [21] | Appl. No. | 702,088 |
| [22] | Filed | Jan. 31, 1968 |
| [45] | Patented | Sept. 15, 1970 |
| [73] | Assignee | Fuji Shashin Film Kabushiki Kaisha<br>Kanagawa, Japan |
| [32] | Priority | Jan. 31, 1967 |
| [33] | | Japan |
| [31] | | 42/6,212 |

[54] CAMERA WITH DETACHABLE SPEED LIGHT POWER SOURCE
2 Claims, 2 Drawing Figs.

[52] U.S. Cl. .................................................. 95/11,
95/31, 95/53
[51] Int. Cl. .............................................. G03b 19/00
[50] Field of Search ............................... 95/11 (Lamp),
31 (Elec.), 53 (Elec.), 86; 317/230, 256

[56] References Cited
UNITED STATES PATENTS

| 877,656 | 1/1908 | Luschka | 317/256X |
|---|---|---|---|
| 2,604,517 | 7/1952 | Brennan | 317/230 |
| 3,358,573 | 12/1967 | Bihlmaier | 95/11 |
| 3,383,994 | 5/1968 | Bihlmaier | 95/11.5 |
| 3,437,021 | 4/1969 | Kapteyn et al. | 95/11 |

*Primary Examiner*—Norton Ansher
*Assistant Examiner*—Robert P. Greiner
*Attorney*—Sughrue, Rothwell, Mion, Zinn and MacPeak ABSTRACT: An electrical cell detachably coupled to a camera body which acts as the power source for a detachable or integral camera speed light. The camera body is provided with a cover which carries a plate-shaped condenser. The plate-shaped condenser is operatively connected to the speed light.

Patented Sept. 15, 1970

3,528,352

INVENTOR
YOSHIZO IKEGAMI

BY *Sughrue, Rothwell, Mion, Zinn & Macpeak*

ATTORNEYS.

CAMERA WITH DETACHABLE SPEED LIGHT POWER SOURCE

The present invention relates to a photographic camera having a "speed light" device either mounted integrally within the camera body or detachably coupled thereto, and more particularly, to a detachable electric power source which is also carried by the camera body. In conventional cameras, since the known speed light devices include cylindrical electrolytic condensers of rather large size, the speed light device is normally separable from the camera body.

It is an object of the present invention to employ a speed light device of relatively small size which utilizes a plate-shaped condenser instead of the conventional large cylindrical electrolytic condenser, thereby allowing the speed light device and the camera body to be formed as a unit allowing convenience for carrying, while the electrical power for the speed light device is formed as a separate unit from the camera body and is attachable to the body during use and readily detachable therefrom.

Figure 1:
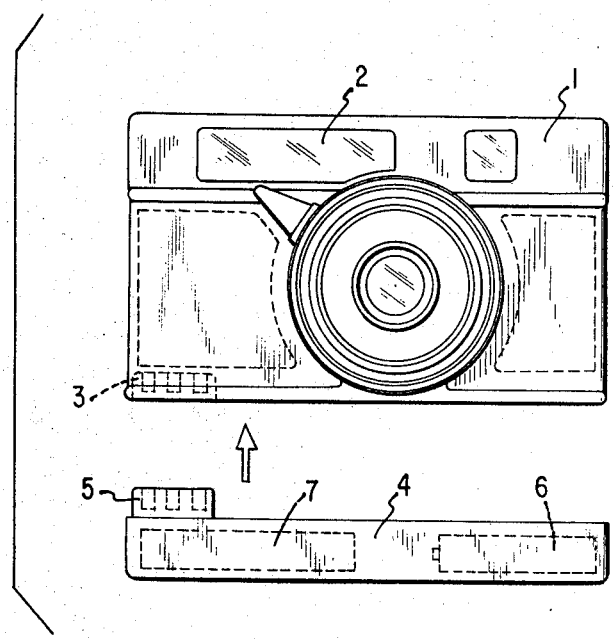
Figure 2:
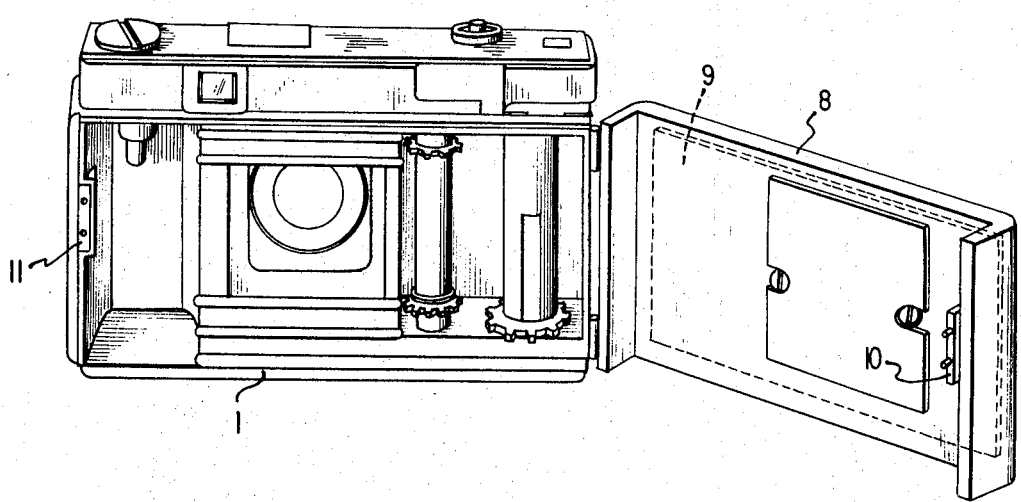

The novelty features that are characteristic of the present invention are set forth with particularity in the appended claims. The invention itself, however, both as to its organization, as well as additional objects and advantages thereof, will be best understood from the following description when read in conjunction with the accompanying drawings, in which:

FIG. 1 is an elevational, exploded view of a camera constructed in accordance with the present invention; and FIG. 2 is a perspective view of the camera of FIG. 1 with the rear cover in open position.

Referring to the drawings, the camera includes a camera body section 1 carrying, at its upper portion, speed light generating means 2, while the bottom of the camera body includes a connecting terminal element 3 which does not project from the bottom plane. The connecting terminal element 3 is connected to the corresponding terminal element 5 carried by the speed light electric power source element 4 which constitutes a casing separate from the camera body 1. The smaller casing 4 forming the electrical power source for the speed light device is adapted to be physically coupled to the camera body section 1 at the bottom section thereof, and the casing 4 includes, as indicated in dotted line fashion, an electric power cell 6 and a booster circuit indicated at 7.

The condenser for this lighting circuit is plate-shaped as described above and is contained within the pivotable rear cover 8 carried by the camera body section 1. As shown in FIG. 2, the plate-shaped condenser 9 is fixed to the rear cover 8, which has the largest plane surface area for the camera body, the condenser 9 being electrically connected to a condenser connecting terminal element 10. A condenser connecting terminal element 11 is carried by the camera body 1 and is so positioned that with the rear cover 8 closed, the condenser 9 is electrically connected to the camera body carried terminal element 3. Thus, by means of terminal elements 3, 5, 10 and 11, the electric cell 6 and the booster circuit element 7 are connected to the speed light generating means 2 in accordance with generally employed principles. In conventional fashion, the speed light means 2 is energized in response to operation of the camera shutter button. In the camera, in accordance with the present invention, the camera body section 1 and the speed light electrical power source section 2 are manufactured separately. The camera can thus be carried by itself without the power source section 4 as a rather compact camera when the speed light is not needed. When the speed light is needed, the electrical power source section 4 may be easily attached to the camera body and is then carried as a unit with the camera. Since the condenser 9 is carried or contained within the back cover 8 of the camera body, the camera is not appreciably larger by either the addition of the condenser or the electric power source section.

Alternatively, the speed light generating means 2 may be formed as a separate unit and may be thus readily attached to the camera body by means of a conventional accessory shoe.

While the invention has been particularly shown and described with reference to a preferred embodiment, it will be understood by those skilled in the art that various changes in form and details may be made therein without departing from the spirit and scope of the invention.

I claim:

1. A photographic camera comprising, in combination: a camera body section, a cover overlying said camera body, a plate-shaped condenser carried by said cover and occupying a major surface area thereof, a speed light operatively coupled to said condenser, a separate speed light power source casing section including an electric cell and booster circuit means within said casing section, and detachable electrical connection means carried by said separate power source casing section and said camera body section whereby, said power source may be readily attached and removed from said camera body.

2. The photographic camera as claimed in claim 1 wherein said speed light is included in and carried by said camera body section.